United States Patent Office 3,403,175
Patented Sept. 24, 1968

3,403,175
PREPARATION OF GLYCOL DIESTERS FROM OLEFINS AND CARBOXYLIC ACID ANHYDRIDES
Larry G. Wolgemuth, Fullerton, Calif., assignor to Union Oil Company of California, Los Angeles, Calif., a corporation of California
No Drawing. Filed Sept. 27, 1965, Ser. No. 490,639
6 Claims. (Cl. 260—497)

ABSTRACT OF THE DISCLOSURE

The invention comprises contacting a hydrocarbon olefin with oxygen in a reaction medium comprising a carboxylic acid anhydride. The contacting is performed at temperatures from about 75° to about 300° C. and, preferably superatmospheric pressures, to oxidize the hydrocarbon olefin and form a glycol diester with the carboxylic acid anhydride. The reaction is performed non-catalytically and products obtained can be directly distilled to recover the desired glycol diester product.

This invention relates to the oxidation of olefins and in particular relates to the preparation of glycol esters by the oxidation of hydrocarbon olefins in the presence of carboxylic acid anhydrides.

Various methods and catalysts have been described for the reaction of olefins with carboxylic acids in the preparation of alkyl esters. Generally, these reaction involve the addition of the carboxylic acid to the olefinic bond to yield a monoester and do not involve oxidation which is necessary to obtain a glycol diester from a mono-olefin. Catalysts have been prescribed for this method to reduce the amount of polymer formed by polymerization of the olefin and to avoid other side reactions.

The reaction according to my invention is as follows:

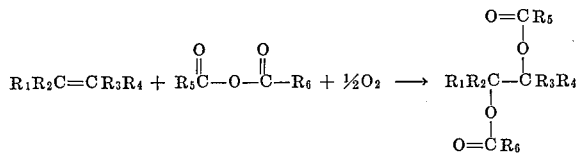

wherein $R_1$, $R_2$, $R_3$ and $R_4$ can be hydrogen, alkyl, aralkyl, aryl, or alkaryl or wherein any two of said groups can be joined to form a cyclic alkyl group; and wherein $R_5$ and $R_6$ can be alkyl, aryl, aralkyl or alkaryl.

The reaction proceeds by the addition of the acetic anhydride to the double bond with oxidation to form the glycol esters.

In general any hydrocarbon olefin having 2 to about 25 carbons can be employed for the oxidation although alkenes of 3 to 12 carbons are preferred. Examples of suitable olefins are ethylene, propylene, butene, isobutylene, 1-pentene, 1-hexene, 2-heptene, 1-octene, 2-nonene, isodecene, 4-dodecene, 1-tridecene, 3-pentadecene, 2-eicosene, etc. Examples of other olefins that can be oxidized include compounds wherein two of the aforementioned R groups are joined to form a cyclic group such as cyclohexene, methylene cyclohexane, etc. Examples of olefins also include those having an aryl group such as styrene, alpha methylstyrene, beta ethylstyrene, vinyl cyclohexane, vinyl naphthalene, etc.

The acid anhydride reacted with the olefin according to my reaction can be the anhydride of acids having from 2 to about 12 carbons and can be aliphatic or aromatic in structure. Preferably the anhydrides are of aliphatic acids having from 2 to about 5 carbons. Examples of suitable acid anhydrides are the anhydrides and mixed anhydrides of acetic acid, propionic acid, butyric acid, isobutyric acid, pentanoic acid, pivalic acid, caprylic acid, caproic acid, capric acid, pelargonic acid, enanthic acid, phthalic acid, 1,2-cyclohexyl dicarboxylic acid, etc. Anhydrides of dicarboxylic acids can also be used such as the aliphatic dicarboxylic acid anhydrides, e.g., malonic, succinic, glutaric, adipic, pimelic, etc., anhydrides.

The reaction is preferably performed in the presence of one of the aforementioned aliphatic acid anhydrides in liquid phase. If desired, up to about 90 percent or more of the aliphatic acid anhydrides can be replaced with a suitable inert organic solvent to provide liquid phase conditions. Examples of suitable organic solvents include sulfones, esters, hydrocarbons, etc.

Examples of sulfones useful as organic solvents include the alkyl and aryl sulfones such as dimethylsulfone, propylethylsulfone, diisopropylsulfone, decylmethylsulfone, butylamylsulfone, diisooctylsulfone, diphenylsulfone, methylbenzylsulfone, etc.

Hydrocarbons including aromatic and aliphatic compounds such as butane, pentane, hexane, octane, decane, benzene, cyclohexane, toluene, xylenes can also be used as well as hydrocarbon distillates comprising mixtures of the aforementioned, e.g., naphtha, kerosene, etc.

Various esters can also be employed as the solvent, e.g., ethyl formate, methyl acetate, ethyl acetate, n-propyl formate, isopropyl acetate, ethyl propionate, n-propyl acetate, sec-butyl acetate, isobutyl acetate, ethyl n-butyrate, n-butyl acetate, isoamyl acetate, n-amyl acetate, ethyl formate, ethylene glycol diacetate, glycol diformate, cyclohexyl acetate, furfuryl acetate, isoamyl n-butyrate, diethyl oxalate, isoamyl isovalerate, methyl benzoate, diethyl malonate, valerolactone, ethyl benzoate, methyl salicylate, n-propyl benzoate, n-dibutyl oxalate, n-butyl benzoate, diisoamyl phthalate, dimethyl phthalate, diethyl phthalate, benzyl benzoate, n-dibutyl phthalate, etc.

The reaction is performed under relatively mild conditions including temperatures from about 75° to about 300° C.; preferably from about 125° to about 175° C. The reaction pressure employed is sufficient to maintain the reactants in liquid phase and provide liquid phase contacting. Generally, pressures from atmospheric to about 100 atmospheres can be used; preferably from about 20 to about 65 atmospheres are employed. The reaction is rapid under the aforementioned conditions with the acid anhydride readily adding to the olefin to form the glycol diester. The reaction can be monitored to determine its completion by any suitable technique, e.g., periodic sampling of the reactants and analysis for the rate of disappearance of the olefin, acid anhydride or the rate of formation of the glycol diester. In general, reaction periods from several seconds to 60 minutes or more can be provided to insure completion of the reaction.

The reaction can be performed batchwise or in a continuous fashion. The oxidation can be practiced batchwise by charging the reactants to a pressure vessel, heating and pressuring the reactants to the desired reaction conditions and then introducing oxygen into contact therewith until substantial completion of the reaction. This completion of the reaction can be also observed when the pressure reaches a steady state condition indicating no further absorption of oxygen by the reaction.

Initiators such as free radical generators can be included in minor amounts to avoid induction periods that can be experienced when operating at the lower temperatures of the aforementioned temperature range or when oxidizing the low molecular weight olefins such as propylene and ethylene. Examples of suitable peroxides which can optionally be used as free radical generators include organic peroxides such as benzoyl peroxide, inorganic peroxides such as sodium or hydrogen peroxide. Other useful generators include peroxides such as peracetic and perbenzoic acids, azo compounds such as azobisisobutyronitrile, etc. Minor amounts of the higher molecular weight olefin can also be used as co-oxidizable substrates, the higher molecular weight olefin contributing the necessary free radicals to initiate the oxidation of the low molecular weight olefin, thereby avoiding any induction period.

The reaction can be practiced continuously by introducing a feed comprising the acid anhydride and the olefin as separate or mixed reactant streams into a reaction zone maintained at the aforementioned reaction conditions. Oxygen can be slowly introduced into contact with the reactants in the reaction zone to support the reaction. In both the batch and continuous contacting techniques, any suitable source of oxygen can be used such as air or oxygen which can be diluted with other inert gases, e.g., carbon dioxide, nitrogen, etc., to provide the desired oxygen content in the reaction zone. It is desired to avoid explosive mixtures of oxygen in the reaction zone gas phase and accordingly the rate of introduction of oxygen is limited to less than that which would provide oxygen contents in excess of about 10 and preferably less than about 5 percent in the gas phase.

The reaction is exothermic and suitable cooling means can be provided to maintain the desired reaction temperature in both of the aforementioned contacting techniques. If desired, a continuous portion of the reactants can be withdrawn and circulated through external cooling means and returned to the oxidation zone to provide a suitable heat removal from these reactants. Internal cooling means can also be provided with a heat exchange medium circulated therethrough as apparent to those skilled in the art.

The product of the oxidation can be readily recovered by distillation, solvent extraction or other suitable techniques for the recovery of diesters from organic reaction solvents. Preferably the reaction solvent employed is higher boiling than the glycol diester product and therefore the product can be readily recovered by simple distillation. To obtain the product in this method, the crude reaction product removed from the reaction zone is distilled and the unconverted olefin is recovered for recycling to further processing. Since the carboxylic acid anhydrides as a general rule will be higher boiling than the glycol diester product, this reactant will concentrate in the distillation bottoms and be available for recycling by returning of the distillation bottoms to the reaction zone. In this manner a simple and effective product recovery can be provided. The distillation can be facilitated by the use of various azeotrope-forming materials which will reduce the boiling point of the glycol diacetate. If desired, vacuum or steam distillation can also be provided to permit the recovery of the product by distillation.

The invention will now be described by reference to the following examples which will serve to illustrate a mode of practicing the invention and to demonstrate results obtainable thereby:

EXAMPLE 1

A one-gallon Teflon lined autoclave equipped with a stirrer and heat exchange coils was charged with 500 milliliters acetic anhydride and 250 grams of 2-butene. The autoclave was pressured to 400 p.s.i.g. with nitrogen and then heated to 330° F. The nitrogen pressure was then adjusted to 700 p.s.i.g. and thereafter oxygen was slowly introduced in 20 p.s.i. increments. A total of 320 p.s.i. of oxygen was consumed under these conditions over a reaction period of 45 minutes. Thereafter the autoclave was cooled, depressured and opened and the liquid contents were removed and distilled to obtain 123 grams of the diacetate of 2,3-butanediol.

EXAMPLE 2

To the autoclave employed in Example 1 was charged 500 milliliters acetic anhydride, 250 grams propylene and 10 milliliters of 1-octene. The autoclave was pressured to 400 p.s.i.g. with nitrogen, heated to 330° F. and then the total pressure was adjusted to 700 p.s.i.g. and oxygen in 20 p.s.i. increments was added over a reaction period of 60 minutes. After the reaction period and after a total of 300 p.s.i. of oxygen had been introduced, the autoclave was cooled, depressured and opened and the liquid reactants contained therein were distilled to obtain 140 grams of the diacetate of 1,2-propanediol.

The oxidation can likewise be practiced on ethylene by repeating the preceding and omitting the propylene. The autoclave is instead pressured to about 200 p.s.i.g. with ethylene and then to 400 p.s.i.g. with nitrogen. The remainder of the procedure is followed including the use of the minor amount of 1-octene to thereby prepare glycol diacetate without a prolonged induction period.

EXAMPLE 3

The autoclave was charged with 500 milliliters acetic anhydride and 200 milliliters 1-octene. The autoclave was closed, pressured to 400 p.s.i.g. with nitrogen and then heated to 212° F. The pressure was adjusted to 700 p.s.i.g. with nitrogen and 60 p.s.i. of oxygen was added. The temperature was raised to 320° F. and reaction occurred. A total of 200 p.s.i. of oxygen was then slowly added in 20 p.s.i. increments. The autoclave was then cooled and opened and the liquid contents recovered and distilled under vacuum to recover acetic acid, unconverted olefin and 15 milliliters of the diacetate of 1,2-octanediol, boiling point 110°–130° C. at 6 mm. mercury.

EXAMPLE 4

The autoclave was charged with 500 milliliters acetic anhydride and 200 milliliters of 1-hexene, heated to 330° F. and the pressure adjusted to 700 p.s.i.g. with nitrogen. Oxygen was then slowly added in ten 20 p.s.i. increments. The autoclave was then cooled, opened and the liquid contents admixed with 1500 milliliters water. The resulting organic layers were then separated, dried over magnesium sulfate and then distilled under vacuum to recover 50 milliliters of distillate comprising chiefly the diacetate of 1,2-hexanediol with a slight amount of 1,2-hexenyl acetate.

EXAMPLE 5

The autoclave was charged with 500 milliliters acetic anhydride and 250 grams isobutylene, then pressured to 600 p.s.i.g. with nitrogen and heated to 330° F. Oxygen in 20 p.s.i. increments was slowly introduced until a total of 320 p.s.i. oxygen had been added. The autoclave was then cooled, opened and the liquid contents were distilled to recover 35 milliliters of the diacetate of 2-methyl 1,2-propanediol. The major by-products recovered were acetone, t-butyl acetate and acetic acid.

The preceding examples are intended solely to illustrate the practice of my invention and to demonstrate the results obtainable thereby. The examples are not to be construed as unduly limiting of the invention and the invention is intended to be defined by the steps and their equivalents set forth in the following claims:

I claim:
1. The oxidation of an ethylenically unsaturated hydrocarbon mono-olefin having 2 to about 25 carbons with oxygen and an anhydride of a hydrocarbon carboxylic acid having from 2 to about 12 carbons to form a glycol diester that comprises contacting said olefin with oxygen and said acid anhydride in a reaction zone at a temperature of from 75° to 300° C. and sufficient pressure to maintain said acid anhydride as a liquid phase in said reaction zone.

2. The oxidation of claim 1 wherein said reaction is performed in the presence of an inert organic solvent which comprises the liquid phase.

3. The oxidation of claim 1 wherein said acid anhydride is acetic anhydride.

4. The oxidation of claim 1 wherein said olefin is ethylene.

5. The oxidation of claim 1 wherein said olefin is 1-butene.

6. The oxidation of claim 1 wherein a mixture comprising propylene and a higher boiling hydrocarbon mono-olefin is used as said hydrocarbon mono-olefin.

References Cited

UNITED STATES PATENTS

| 2,497,408 | 2/1950 | Gresham | 260—497 |
| 2,519,754 | 8/1950 | Gresham et al. | 260—497 |
| 2,779,783 | 1/1957 | Hayes | 260—475 |

LORRAINE A. WEINBERGER, *Primary Examiner.*

V. GARNER, *Assistant Examiner.*